UNITED STATES PATENT OFFICE.

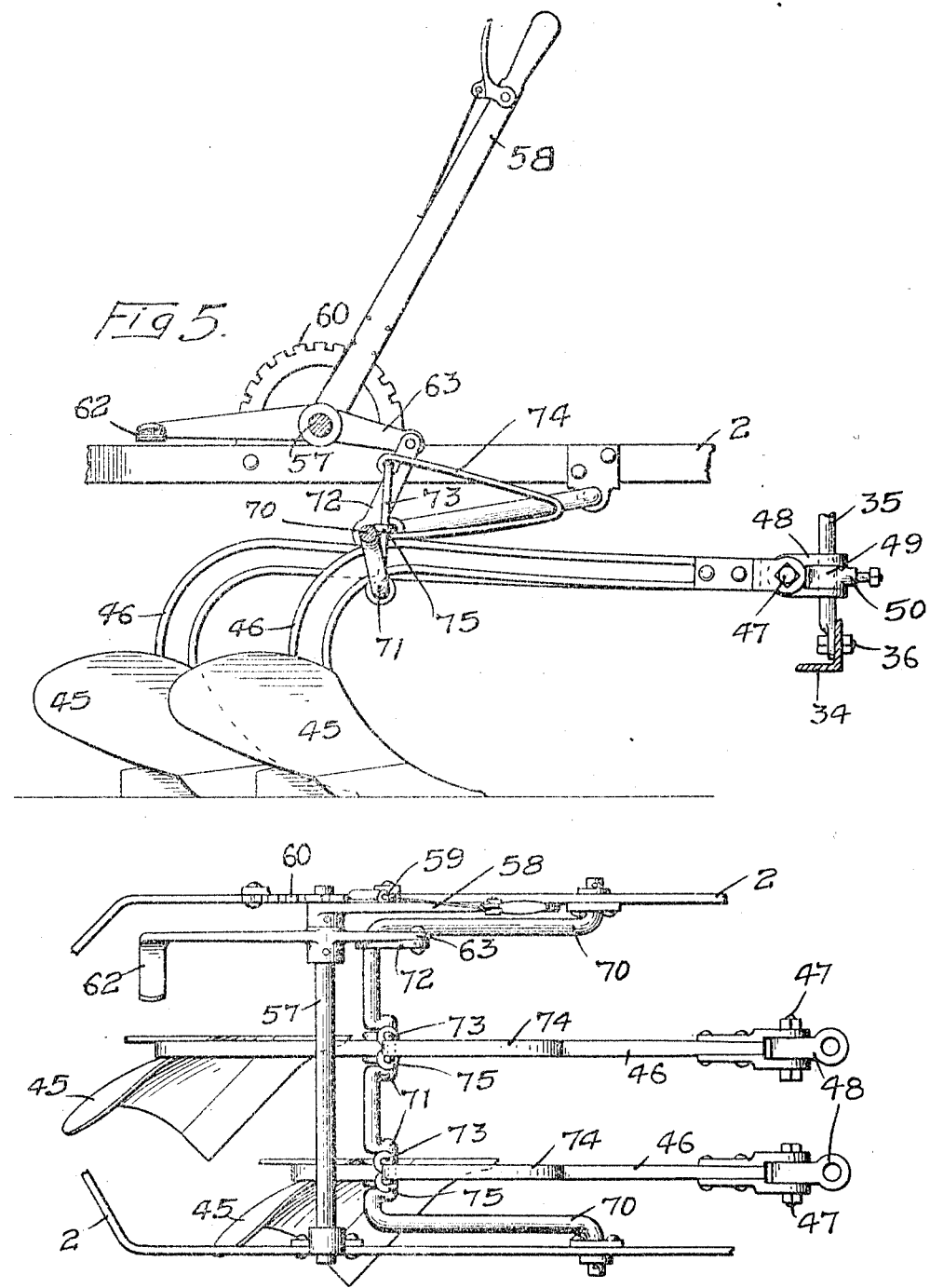

PATRICK M. MALONEY AND JACOB RANGE, OF MINNEAPOLIS, MINNESOTA, ASSIGNORS OF ONE-THIRD TO HARRY R. WILL, OF MINNEAPOLIS, MINNESOTA.

GANG-PLOW.

1,116,089.  Specification of Letters Patent. Patented Nov. 3, 1914.

Application filed December 26, 1911. Serial No. 667,951.

*To all whom it may concern:*

Be it known that we, PATRICK M. MALONEY and JACOB RANGE, citizens of the United States, and residents of Minneapolis, in the county of Hennepin and State of Minnesota, have invented certain Improvements in Gang-Plows, of which the following is a specification.

This invention relates to improvements in gang plows and the objects we have in view are to provide a gang plow with loose beams whereby the plows are capable of swinging laterally in either direction, while they are at the same time capable of being swung upward for the purpose of lifting them from the furrow and above the ground; also to provide improved means for raising or depressing the forward ends of the plow beams so as to cause the plows to make shallower or deeper furrows; also to provide improved means for tilting the plow beams and plows, and also to provide improved means for controlling the relations of the plow frame to the supporting wheels, and improved means for controlling the movements of the wheels in turning the plow at the ends of the furrows.

Our invention consists generally in the constructions and combinations hereinafter described and particularly pointed out in the claims.

Figure 1:
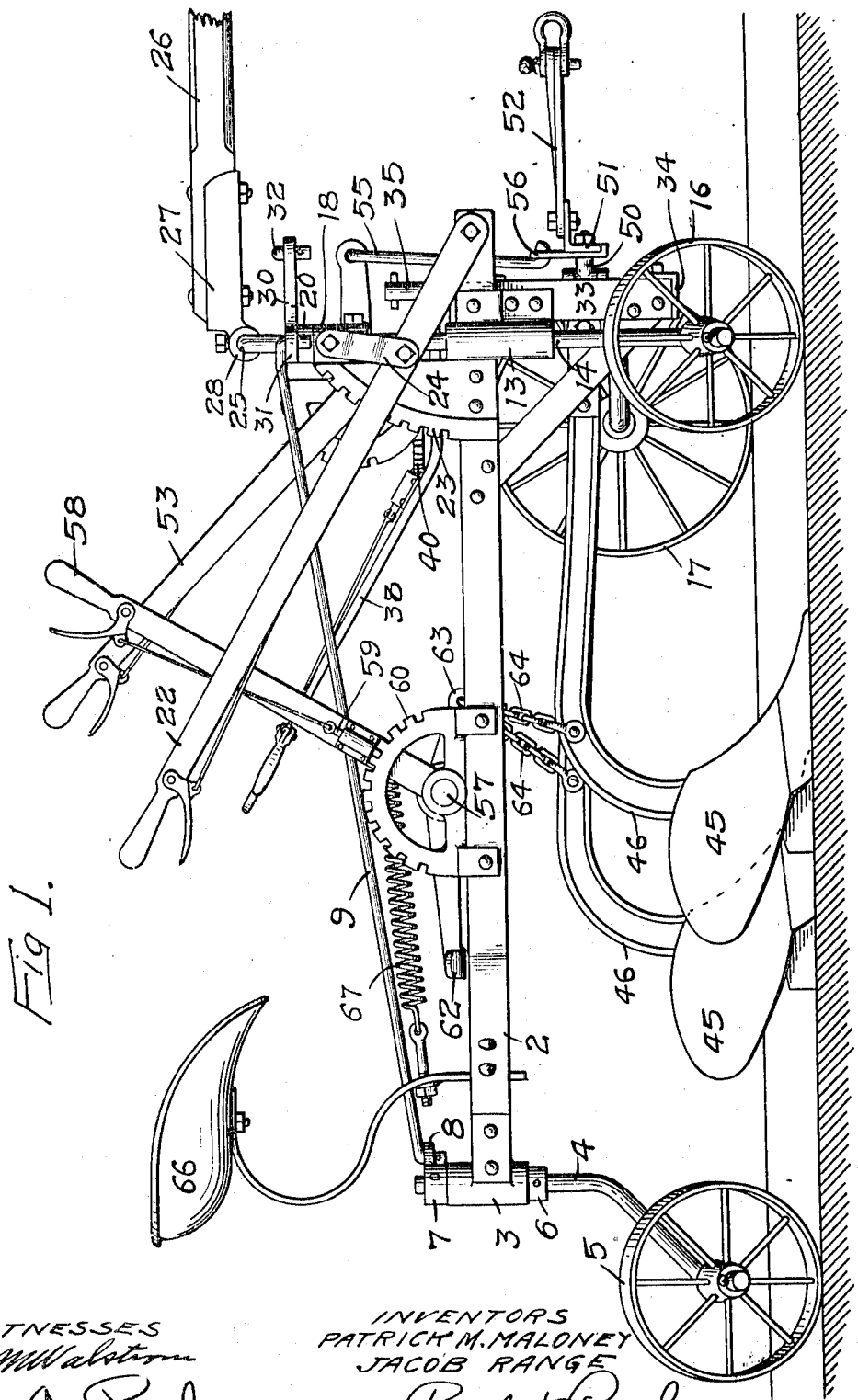
Figure 2:
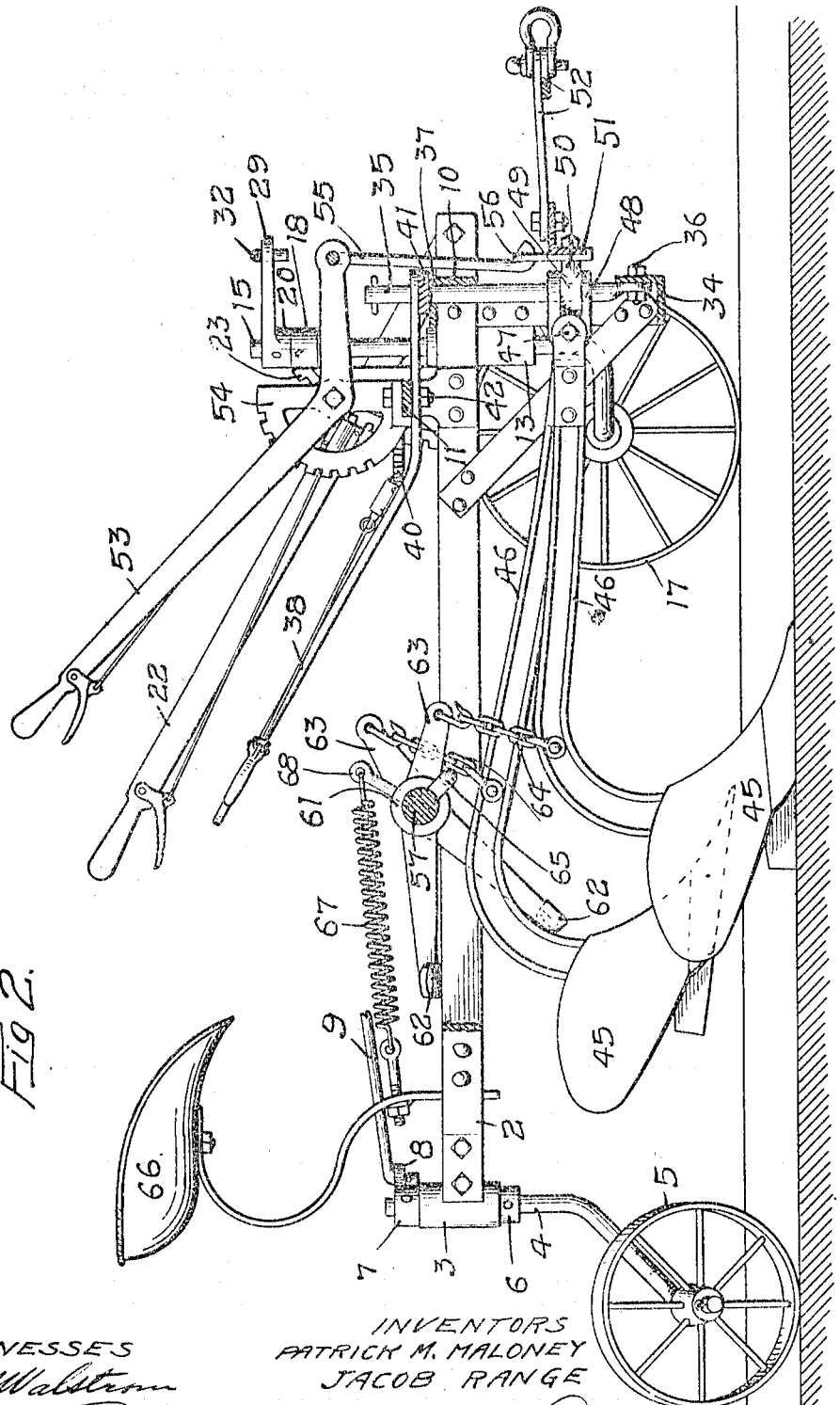
Figure 3:
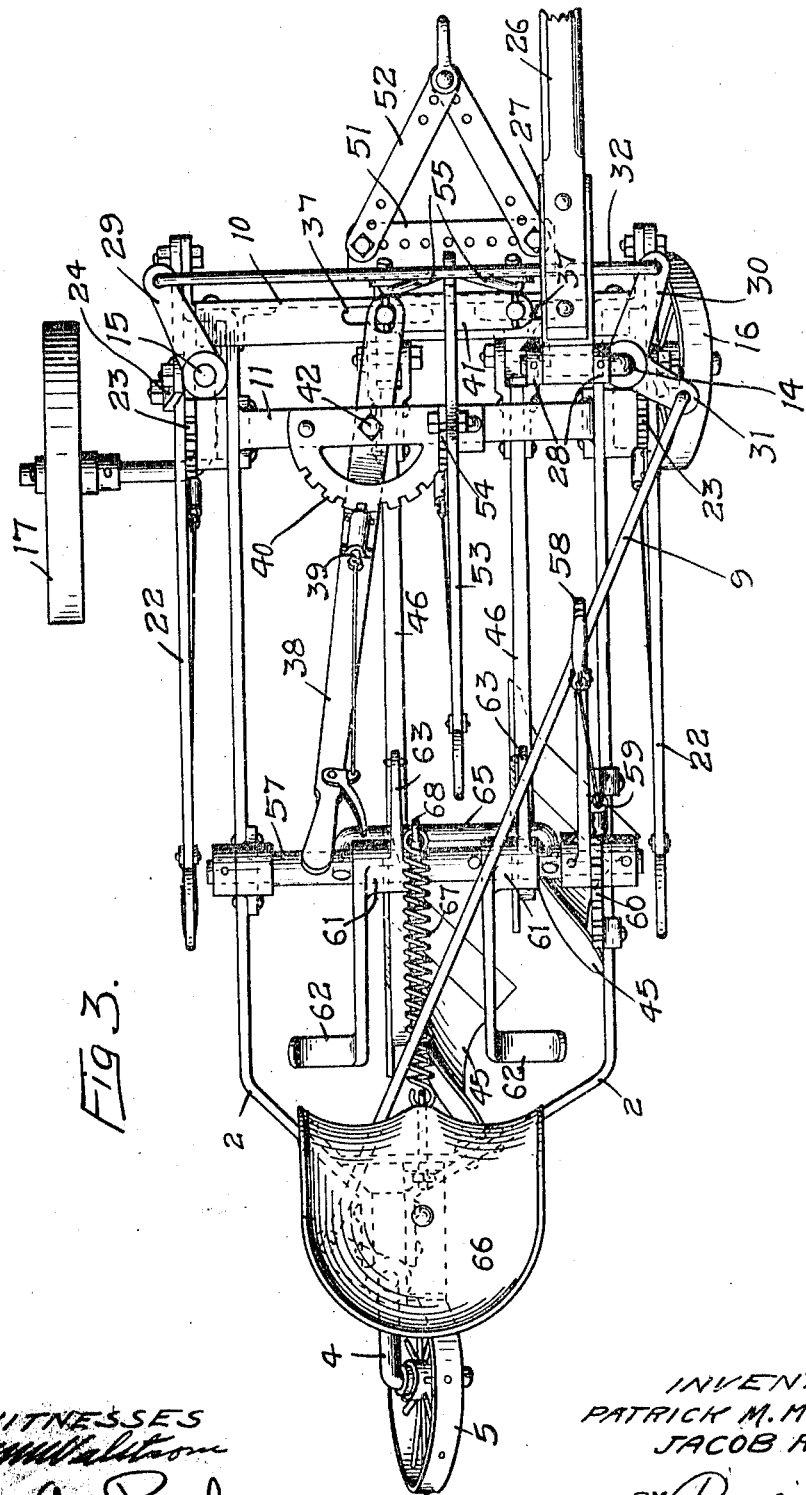
Figure 4:
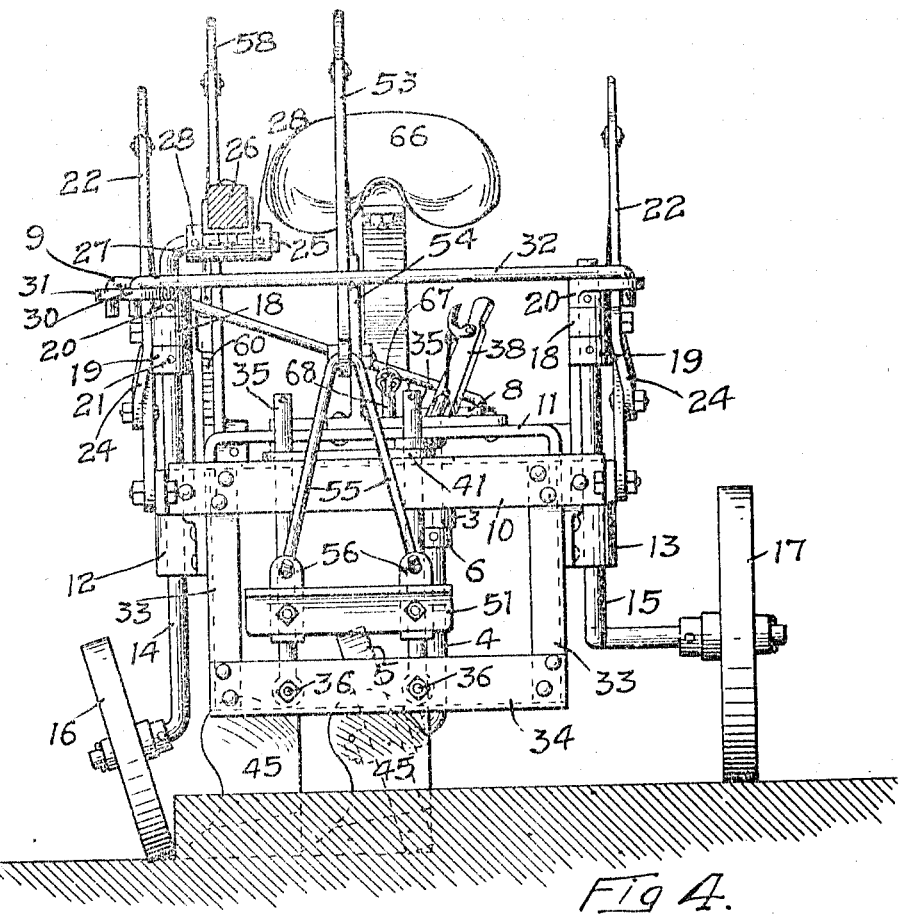

In the accompanying drawings forming part of this specification, Figure 1 is a side elevation of a gang plow embodying our invention, Fig. 2 is a longitudinal section through the frame of the machine, the plows being shown in elevation and one of said plows being shown in a raised position. Fig. 3 is a plan view. Fig. 4 is a front end elevation, with the steering or guiding tongue in section. Fig. 5 is a detail showing a device for preventing lateral swinging of the plows, particularly adapted for plowing on a side hill. Fig. 6 is a plan view of the structure shown in Fig. 5.

The machine is provided with a suitable main frame consisting preferably of longitudinally extending side bars 2, 2 which are brought together at the rear end of the machine, and preferably have secured between them a suitable block carrying an upright, hollow post 3 in which the vertical standard 4 for the rear caster wheel 5 is journaled. This shaft 4 has a stub axle formed at its lower end on which the wheel 5 is mounted. This shaft is provided with a collar 6 which forms a support for the rear end of the main frame, and on the upper end of said shaft we provide a collar 7 having a crank arm 8, to which the turning rod 9 hereinafter described is connected. The side bars 2 of said main frame are preferably connected at their forward ends by the cross bar 10 and a cross plate 11 is also secured to said side bars, extending transversely of the machine from one of said bars to the other. The forward end of the frame is provided with the vertical boxes 12 and 13, in which are journaled the upright crank shafts 14 and 15. These shafts support upon their lower cranked ends the wheels 16 and 17, the wheel 16 being preferably arranged at an angle to the perpendicular and being adapted to travel in the previously formed furrow and to bear against the vertical wall thereof. The wheel 17 stands upright and travels upon the land or unplowed ground.

We prefer to provide means by which the main frame may be raised and lowered upon said upright shafts. As here shown each of said shafts is provided preferably near its upper end with a collar 18 in which said shaft is adapted to turn freely. To retain the same vertical relation between the collars 18 and the shafts 14 and 15 we secure to said shafts above and below said collars 18, sleeves 19 and 20, which are preferably rigidly fastened to said shafts in any suitable manner. We have indicated in the drawings, pin 21, by which said sleeves are fastened to said shafts. Adjusting levers 22, 22 are arranged at opposite sides of the machine frame and are preferably pivoted near their ends to said side bars 2, 2. Suitable notched segments 23 are provided upon the frame of the machine in position to have the notches therein engaged by suitable latches upon said levers. Links 24 connect the levers 22 with the collars 18. It will be seen that by depressing the free end of either of the levers 22 the corresponding side of the frame of the machine will be moved upward, sliding on its vertical shaft 14 or 15. By this means either or both sides of the machine frame may be raised or lowered.

The shaft 14 is preferably provided at its upper end with a horizontal crank arm 25, and to this crank arm the guiding pole or tongue 26 of the machine is preferably secured by means of a suitable flanged clip 27. The end of this clip engages the crank arm 25, being preferably held thereon between rigid collars 28. By this means the tongue can move freely up and down, but any lateral movement of the tongue will cause the vertical shaft 14 to be turned in its bearing. The collar 20 on the land side of the machine is preferably provided with a crank arm 29, while the other collar 20 on the other side of the machine is provided with two arms 30 and 31. The rod 9 preferably connects the crank arm of the rear caster wheel with the arm 31 and the rod 32 connects the arms 29 and 30. By this means, as the tongue or pole 26 is turned to the right or left all three of the wheels are simultaneously turned. By this means when the plow reaches the end of the furrow it can be turned around with a very short turn.

The forward end of the plow frame is preferably provided with the depending standards 33, the lower ends of which are connected by the cross bar 34. The standards 33 are preferably secured at their upper ends to the cross bar 10 which is preferably formed of a plate of angle iron. Upright non-revolving shafts 35, 35 have their lower ends pivotally connected preferably by suitable bolts 36 with the plate 34 and their upper portions pass through slots 37, 37 in the horizontal portion of the cross bar 10. This manner of mounting the shafts 35 permits their upper ends to swing either to the right or left, thereby tilting said shafts into positions inclined in either direction from the perpendicular. For tilting the shafts I prefer to provide a horizontally swinging lever 38 having a latch 39 adapted to engage a notched locking plate 40 and having its forward end preferably engaging one of said shafts 35, the two shafts being connected by a link 41. The lever 38 is preferably pivoted at 42 to the cross bar 11. By means of this lever the shafts 35 may be tilted in either direction to a greater or less extent and may be locked in the inclined position to which they are moved by said lever.

We have shown in the drawings two plows 45, 45, each provided with a suitable plow beam 46 connected at its forward end by a horizontal bolt or pivot 47 to a clevis 48 having a forked forward end engaging one of the shafts 35. These plows and plow beams may be of any suitable or preferred construction. They are capable of swinging vertically on the horizontal pivots 47 and the clevises 48 are capable of swinging horizontally on the shafts 35, said clevises are also capable of being moved up or down on said shafts 35 and for the purpose of moving them we preferably provide blocks 49 which are arranged upon said shafts 35 between the forks of the clevises, and are each provided with a projection 50 to which projection a cross plate 51 is secured. The cross plate 51 is preferably made of angle iron and to it draft links 52 are secured to which a team may be hitched for pulling the plow. For the purpose of raising and lowering the plate 51 and with it the forward ends of the plows we provide a suitable lever 53 pivoted to an upright 54 upon the cross plate 11, the forward end of said lever having connected to it a link 55 which is also connected at its lower end to suitable lugs 56 secured to the plate 51. By operating the lever 53 the forward ends of the plow beams may be raised or lowered and the points of the plows held horizontal or tilted upward or downward.

For lifting the plows out of the ground and holding them when raised we preferably provide a shaft 57 mounted in bearings on the frame of the machine and having secured to it an operating lever 58, having a latch 59 adapted to engage a notched locking plate 60 secured to one of the side bars 2. Mounted so as to turn freely upon the shaft 57 are the hubs 61, each of which is provided with a foot lever 62 and a projecting arm 63. Chains 64 connect the arms 63 with the plow beams. By means of these foot levers the operator can raise either of the plows without raising the other. A bail 65 is secured to the shaft 57 and passes under both of the projecting arms 63. When the operator desires to raise both plows he does so by means of the lever 58 and he can by means of this lever and its latch lock them in an elevated position. A suitable seat 66 is preferably provided upon the frame of the machine for the operator who, while sitting thereon, will be in convenient position to manipulate any of the hand levers or either of the foot levers, and who can also drive a team by which the plow is drawn.

For the purpose of counterbalancing the weight of the plows and assisting in elevating the same we prefer to provide a spring 67 attached to an arm 68 upon the shaft 57 and connected to a stationary part of the machine at its opposite end. We have here shown one end of the spring connected by a suitable eye-bolt to the seat standard. When the plows are lowered the spring is put under tension and when they are raised the spring assists in lifting them.

In Figs. 5 and 6 of the drawings we have shown a locking means which may be arranged to engage the plow beams to prevent them from swinging laterally in either direction. This means consists of a double crank rod 70, having its ends journaled in the side bars of the frame and capable of swinging freely in its support. This rod is provided with two loops 71 which pass under and engage the plow beams and prevent them from swinging laterally in either direction on the vertical shafts 35, which form pivotal supports for the clevises to which the forward ends of the plow beams are connected. The shaft 57 in this instance is provided with a single crank arm 63 to which is connected a link 72 that engages the swinging rod 70. Either the foot lever 62 or the hand lever 58 may be used for turning the shaft 57 and raising or lowering the swinging rod 70 and with it the plow beams and plows. For the purpose of holding the plows down with a yielding pressure we prefer to provide in this instance the stirrups 73 that are connected at their lower end to the bottoms of the loop 71 at opposite sides of the plow beams. These stirrups rise above the plow beams and springs 74 preferably of V-shape have their upper ends connected to the stirrup 73 while their lower ends bear upon said plow beams. Loops 75 pass around the stirrup 73 and above the lower ends of the spring 74, holding said stirrups and springs in position.

Under normal conditions the plow beams are free to swing laterally but under certain conditions said beams may be locked against lateral swing by manipulation of the swinging crank rod 70 so as to bring the loops 71 of the crank rod in position against the p'w beams and thus lock and prevent lateral swing of the beams. When however the crank rod is lowered its loops 71 are moved away from the plow beams so that the latter are then free to swing laterally under restraint of the springs. The spring system 73, 74 and 75 is strong enough to serve the purpose assigned to those springs but not so much so as to prevent the lateral swing of the plow beams when the crank 70 is moved away from the beams.

Operation: With this plow the furrows may be cut wide or narrow, deep or shallow. The operator by means of the lever described can raise or lower the forward ends of the plow beams thereby adjusting the points of the plow to secure the depths of furrow desired. By tilting the vertical shaft 35 he can also tilt the plow beams and plows in either direction from the perpendicular. Tilting the plows causes them to run to a greater or less distance into the land thereby increasing or decreasing the width of the furrows. Ordinarily the plows are left free so that they can swing laterally in either direction, thereby causing them to automatically swing past stones, stumps or other obstructions. Whenever desired, the operator can, by means of the foot levers, raise either one of the plows free from the ground to pass over an obstruction or for any other purpose. By means of the hand lever 58 he can raise both plows and can lock them in an elevated position. By means of the levers 22 he can adjust the height of the frame from the ground and through connecting rods described the plow is made capable of a very short turn whenever desired. When it is desired to prevent the plows from swinging laterally as in the plowing of a side hill, the locking means shown in Figs. 5 and 6 of the drawings may be connected to the plow beams, thus preventing any lateral movement of said beams.

We do not limit ourselves to the details of the construction herein shown and described as the same may obviously be varied in many particulars without departing from our invention.

We claim as our invention:

1. In a plow, the combination, with a suitable frame and supporting wheels, of an upright shaft secured upon said frame, a clevis mounted to be vertically adjustable upon said shaft and arranged to swing in a horizontal plane thereon, an adjusting block mounted upon said shaft in engagement with a portion of said clevis, a plow provided with a suitable beam connected at its forward end to said clevis by a horizontal pivot and draft means connected with said block so as to be adjustable with the adjustment of the clevis on the vertical shaft, substantially as described.

2. In a plow, the combination, with a suitable frame and supporting wheels, of an upright shaft pivotally secured at its lower end upon said frame, means for moving the upper end of said shaft toward either side of the frame, thereby adjusting the shaft to an inclined position, a clevis mounted to be vertically adjustable upon said shaft and arranged to turn thereon, a pivot pin connected to said clevis at right angles to the line of said shaft, a block vertically slidable on said shaft and connected with the clevis, draft means connected with said block so as to be adjustable with the adjustment of the clevis on the vertical shaft, and a plow provided with a beam having its forward end connected to said pivot, substantially as described.

3. In a gang plow, the combination, with a suitable frame and supporting wheels, of two upright shafts secured upon said frame, both of which are connected together and capable of lateral movement, means for moving the upper ends of said shafts toward either side of the frame and thereby adjusting the shafts to an inclined position, a clevis mounted upon each of said shafts and arranged to turn thereon, a block vertically slidable on said shaft and connected with the clevis, draft means connected with said block so as to be adjustable with the adjustment of the clevis on the vertical shaft, and plows, each provided with a beam having its forward and connected to the corresponding clevis by a horizontal pivot, substantially as described.

4. In a gang plow, the combination, with a suitable frame having supporting wheels, of upright shafts secured upon said frame, means for moving the upper ends of said shafts toward either side of the frame and thereby adjusting the shafts to an inclined position, a clevis mounted upon each of said shafts and arranged to turn thereon, means for raising and lowering each clevis upon its supporting shaft and draft means connected with said clevis so as to be adjustable with the adjustment of the clevis on the vertical shaft, and plows, each provided with a beam having its forward end connected to the corresponding clevis by a horizontal pivot, substantially as described.

5. In a gang-plow, the combination with a suitable frame and supporting wheels, of an upright shaft secured upon said frame, a clevis mounted to be vertically adjustable upon said shaft and to swing in a horizontal plane, a plow provided with a beam connected at its forward end to the clevis for vertical swinging movement, and a block vertically slidable on said shaft and connected with the clevis, and draft means connected with said block so as to be adjustable with the adjustment of the clevis on the vertical shaft, substantially as described.

6. In a gang-plow, the combination with a suitable frame and supporting wheels, of an upright shaft secured upon said frame, a plow-beam, a clevis having the forward end of the beam hinged thereto and slidably mounted on said shaft, draft means, a block operatively associated with said clevis and slidably mounted on said shaft and having the draft means connected thereto, and means for adjusting said block to effect a simultaneous adjustment of the draft means and the forward end of the plow-beam, substantially as described.

In witness whereof, we have hereunto set our hands this 9th day of December 1911.

PATRICK M. MALONEY.
JACOB RANGE.

Witnesses:
GENEVIEVE E. SORENSEN,
C. H. REHFUSS.